(12) United States Patent
Shirashima et al.

(10) Patent No.: US 6,275,465 B1
(45) Date of Patent: Aug. 14, 2001

(54) DISC CLAMPING MECHANISM AND DISK PLAYER PROVIDED WITH THE CLAMPING MECHANISM

(75) Inventors: Hitoshi Shirashima; Shoji Suzuki, both of Iwaki (JP)

(73) Assignee: Alpine Electronics, Inc. (JP)

( * ) Notice: Subject to any disclaimer, the term of this patent is extended or adjusted under 35 U.S.C. 154(b) by 0 days.

(21) Appl. No.: 09/428,115

(22) Filed: Oct. 27, 1999

(30) Foreign Application Priority Data

Nov. 20, 1998 (JP) ................................................ 10-330549

(51) Int. Cl.[7] ............................ G11B 23/00; G11B 25/00
(52) U.S. Cl. ............................................................. 369/270
(58) Field of Search ................................. 369/270, 264, 369/258, 261; 360/99.05, 99.08, 99.12

(56) References Cited

U.S. PATENT DOCUMENTS

| | | | |
|---|---|---|---|
| 4,736,358 | * | 4/1988 | Hoshi et al. .......................... 369/270 |
| 5,247,496 | * | 9/1993 | Yamatani ................................ 369/13 |
| 5,596,561 | | 1/1997 | Toyoguchi ........................... 369/77.1 |

* cited by examiner

Primary Examiner—Robert S. Tupper
Assistant Examiner—Julie Anne Watko
(74) Attorney, Agent, or Firm—Brinks Hofer Gilson & Lione (57) ABSTRACT

A CD disk clamping mechanism, and a CD player encompassing a disk clamping mechanism, such that when a clamp arm swings in a clamp-released direction, a contact position of a pressed part with the energizing arm moves farther toward the front end of the energizing arm. Therefore, the length of action of the energizing arm is elongated, and thereby the energizing force applied to the clamp arm can be restrained from increase, as the clamp arm swings in the clamp-released direction.

15 Claims, 5 Drawing Sheets

PRIOR ART

FIG.5A

PRIOR ART

FIG.5B

DISC CLAMPING MECHANISM AND DISK PLAYER PROVIDED WITH THE CLAMPING MECHANISM

BACKGROUND OF THE INVENTION

1. Field of the Invention

The present invention relates to a disk clamping mechanism that clamps a disk such as a CD (compact disk) between a turn table and a clamper. Specially, it relates to a disk clamping mechanism that can securely clamp a disk and make a smooth and easy transition from a clamped state to a clamp-released state of the disk.

2. Description of the Related Art

Figure 5A:
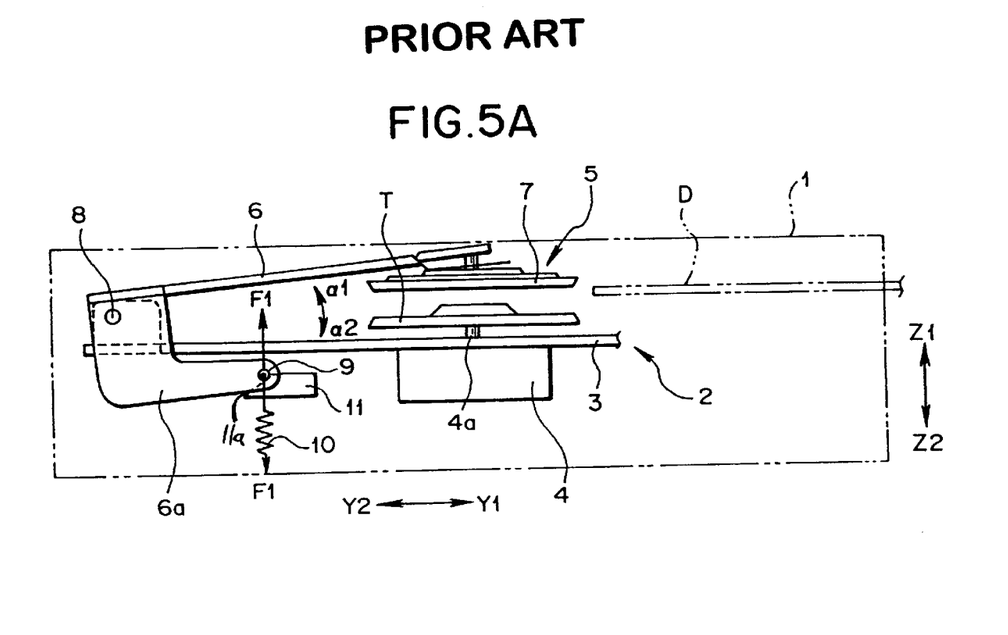
FIG. 5A shows a clamp-released state of the disk and FIG. 5B shows a clamped state.
Figure 5B:
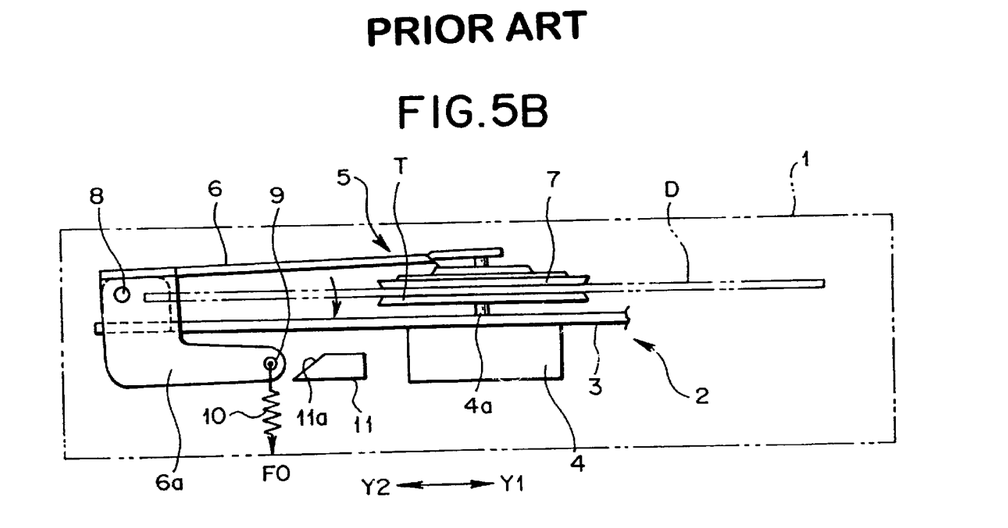

FIG. 5 is a side view to illustrate a compact disk (hereunder, abbreviated as CD) player incorporating the conventional clamping mechanism, in which FIG. 5A shows a clamp-released state, and FIG. 5B shows a clamped state.

As shown in FIG. 5, a disk drive unit 2 is provided inside an enclosure 1 of the CD player. The disk drive unit 2 is made up with a spindle motor 4 provided on a drive chassis 3, a turntable T fixed on a rotary shaft 4a of the spindle motor 4, and a pickup not illustrated, etc.

A disk clamping mechanism 5 is provided on the upper part of the drive chassis 3. The disk clamping mechanism 5 comprises a clamp arm 6 and a clamper 7 supported so as to freely rotate on the front end (Y1 side) of the clamp arm 6. The clamp arm 6 is supported on the base of the Y2 side to freely swing in the α1 direction (clamp-released direction) and in the α2 direction (clamped direction) against the drive chassis 3, with a swing shaft 8 serving as the fulcrum.

The clamp arm 6 has an operating member 6a that is formed bent downward in a virtually L-shape under the drive chassis 3. The operating member 6a has a clamp spring 10 attached, such as a coil spring or the like. By this clamp spring 10, the clamp arm 6 is energized in the α2 direction. A pressed part 9, which extends perpendicularly to the side view shown in FIG. 5, is provided on the front end (Y1 side) of the operating part 6a. This pressed part 9 is formed of a pin fastened to the operating member 6a, or the like.

A pressing member 11 that is moved in the Y1 and Y2 directions by a drive means (not shown) is provided so as to face the pressed part 9. As shown in FIG. 5A, as the pressing member 11 is moved in the Y2 direction, the pressed part 9 provided on the operating part 6a of the clamp arm 6 is pushed up in the Z1 direction by a taper 11a of the pressing member 11. Thereby, the clamp arm 6 is swung in the α1 direction, and the clamper 7 takes off from the turntable T into the clamp-released state. On the other hand, as shown in FIG. 5B, as the pressing member 11 is moved in the Y1 direction, the pressing member 11 takes off from the pressed part 9. At this moment, since the operating part 6a receives the energizing force from the clamp spring 10, the clamp arm 6 is swung in the α2 direction, and being clamped between the clamper 7 and the turntable T, a disk D is put in the clamped state. This clamping force is determined by the elasticity of the clamp spring 10.

A disk conveying means (not shown) is provided on the Y1 side of the disk drive unit 2. If the CD player is intended for a single disk insertion, the disk conveying means is, for example, a carrier roller. When the disk D (compact disk) is inserted from an insertion slot (not shown) provided on the front panel, the disk D is conveyed to the disk drive unit 2, receiving a feeding force by the carrier roller.

If the CD player is designed as a disk changer system, the conveying means is, for example, a tray conveying mechanism that pulls out trays inside a magazine. When the tray is pulled out in the Y2 direction, the disk mounted on the tray is transferred to the disk drive unit 2.

In the foregoing disk clamping mechanism 5, the clamp arm 6 is energized in the clamping direction by the elasticity of the clamp spring 10. The elongation of the clamp spring 10 becomes longer in the clamp-released state shown in FIG. 5A than in the clamped state shown in FIG. 5B. That is, if the elasticity in the clamping direction that acts on the clamp arm 6 in the clamped state is F0, and the elasticity in the clamping direction that acts on the clamp arm 6 in the clamp-released state is F1, F1>F0.

That is, the energizing force becomes greater in the clamp-released state than in the clamped state. This situation does not change in such a structure that the arm of a torsion spring attached to the swing shaft 8 is hooked on the operating member 6a and the clamp arm 6 is energized in the clamping direction.

In the clamped state of the disk shown in FIG. 5B, it is necessary to increase the elasticity F0 to some extent in order to securely clamp the center of the disk D on the turntable T. Accordingly, as shown in FIG. 5A, the elasticity F1 that acts on the clamp arm 6 increases still more, when the clamp arm 6 is pushed up in the clamp-released direction.

As a result, when the pressing member 11 pushes up the pressed part 9 in opposition to the elasticity F1, the resistance that acts on the pressing member 11 becomes extremely increased, and a greater driving force to move the pressing member 11 in the Y2 direction becomes necessary, which inevitably requires a greater power consumption for a motor and the like. Further, the slide friction between the pressing member 11 and the pressed part 9 also increases, and the wear of components tends to increase.

Further, in the conventional example shown in FIG. 5, if the clamp arm 6 is swung to a great extent in the α1 direction by an external force during the process of manufacturing or maintenance, the clamp spring 10 will be stretched out to its breaking point, which is a problem to be resolved.

Therefore, it is conceivable to install a stopper (not shown) that restricts the swing range of the clamp arm 6 in the α1 direction. However, the installation of this stopper will create troubles in the assembly process while incorporating the clamp arm 6 onto the drive chassis 3, because the stopper becomes an obstacle. This will increase the number of components.

The present invention intends to solve those problems of the conventional technique. It is therefore an object of the invention to provide a disk clamping mechanism capable of varying the energizing force that acts on the clamp arm to an appropriate degree in correspondence with the clamped state and the clamp-released state, displaying an ample clamping force in the clamped state, and reducing the load that acts on a clamp switching means during the movement toward the clamp-released state.

Further, it is another object of the invention to provide a disk clamping mechanism that enables to give a limit to the swing angle of the clamp arm in the clamp-released direction without installing a stopper, whereby a breakage of the clamp spring or the like will not be created.

BRIEF SUMMARY OF THE INVENTION

In order to accomplish the foregoing objects of the invention, the disk clamping mechanism comprises: a turntable that gives a rotation to a disk; a clamp arm supported so as to freely swing in a clamped direction facing the turntable and in a clamp-released direction facing opposite the turntable; a clamper supported by the clamp arm so as to freely rotate, which clamps the disk between the turntable and the clamper; an energizing means, the energizing means for energizing the clamp arm in the clamped direction; and a clamp switching means, the clamp switching means for swinging the clamp arm in the clamp-released direction against an energizing force of the energizing means.

In this construction, the energizing means swings so as to follow a swing of the clamp arm, and possesses an energizing arm that applies the energizing force in the clamped direction to a pressed part of the clamp arm. Further, the positions of a swing fulcrum of the clamp arm and a support end for the energizing arm are set in such a manner that the point of the energizing force applied from the energizing arm to the pressed part moves farther from the support end for the energizing arm as the clamp arm swings in the clamp-released direction.

The disk clamping mechanism of this invention can be applied to a CD player, DVD (digital versatile disk) player, MD (mini disk) player, FD (floppy disk), and the like.

It may be applied to a player on which a single disk is mounted individually, or to a player in which one disk out of a plurality of disks is selected to be drawn out, and clamped.

The pressed part is a pin fastened to the clamp arm, a bent piece that is formed by bending the clamp arm, or the like. The energizing arm may be brought into direct contact with the pressed part, or the energizing force of the energizing arm may be applied to the pressed part through an intermediate member.

The aforementioned invention can be implemented with a structure such that the distance between the fulcrum of the clamp arm and the point of application is longer than the distance between the support end for the energizing arm and the point of application, and the support end for the energizing arm is located more forward in the clamped direction than is the fulcrum of the clamp arm.

In this invention, if the energizing force for pressing the clamper to the turntable is increased in the clamped state, the energizing force that acts on the clamp arm in the clamp-released state will be restrained from increase. For example, it is possible to set the energizing forces that act on the clamp arm in the clamped state and in the clamp-released state to substantially the same level. The load when the clamp switching means raises the clamp arm can be reduced accordingly.

In the foregoing construction, it is preferable that the energizing arm is in direct contact with the pressed part; the energizing arm is provided with a hook part that hinders the pressed part from moving when the contact point of the pressed part moves farther from the support end for the energizing arm; and a limit of the swing of the clamp arm in the clamp-released direction is given when the pressed part is restrained by the hook part.

Since the energizing means can act as a stopper that determines the swing limit of the clamp arm, this structure makes it unnecessary to provide a stopper mechanism separately that determines the swing limit of the clamp arm.

Further, an arm of a torsion spring or a flat spring can act as the energizing arm.

Thus, the structure can be simplified by forming the energizing arm with a spring member that exhibits the elasticity in itself. For example, it is only needed to incorporate the clamp arm and thereafter incorporate the torsion spring into the drive chassis, in order to make up the energizing means that gives the energizing force to the clamp arm and also possesses the stopper function.

However in this invention, the energizing means only requires that the point of the energizing force applied to the pressed part can move along the energizing arm. For example, the energizing means may be one that energizes a lever that swings, using one end as the fulcrum, by a spring n the swing direction.

BRIEF DESCRIPTION OF THE SEVERAL VIEWS OF THE DRAWING

FIG. 1 is a side view of a CD player provided with a disk clamping mechanism of an embodiment of the invention, in which

FIG. 5 is a side view that illustrates a CD player incorporating the conventional clamping mechanism, in which

DETAILED DESCRIPTION OF THE INVENTION

The invention will now be described with reference to the accompanying drawings.

Figure 1A:
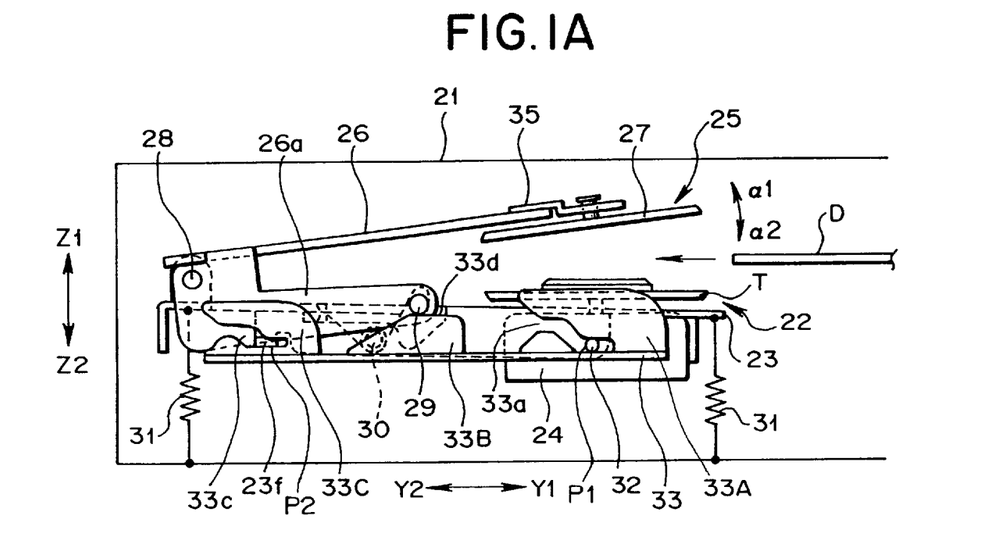
FIG. 1A illustrates a clamp-released state of a disk and FIG. 1B illustrates a clamped state.
Figure 1B:
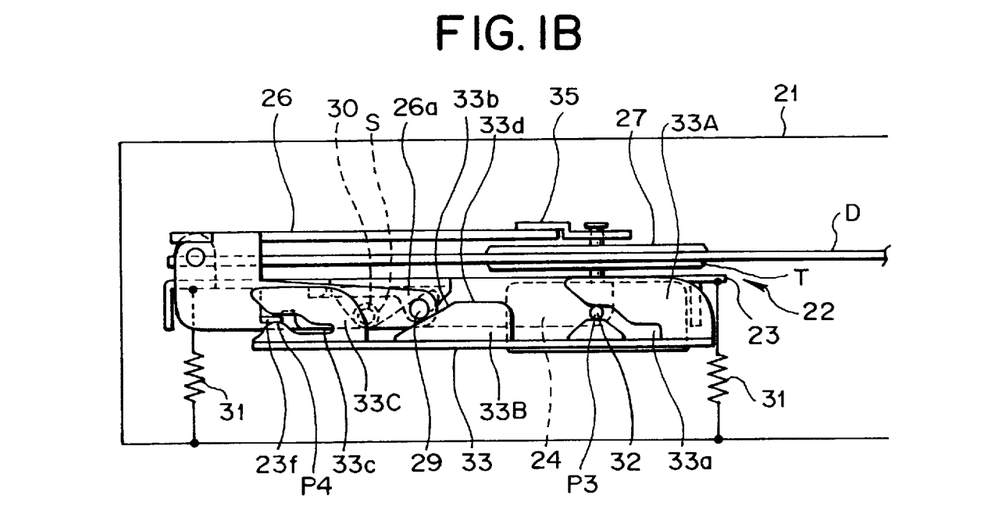
Figure 2:
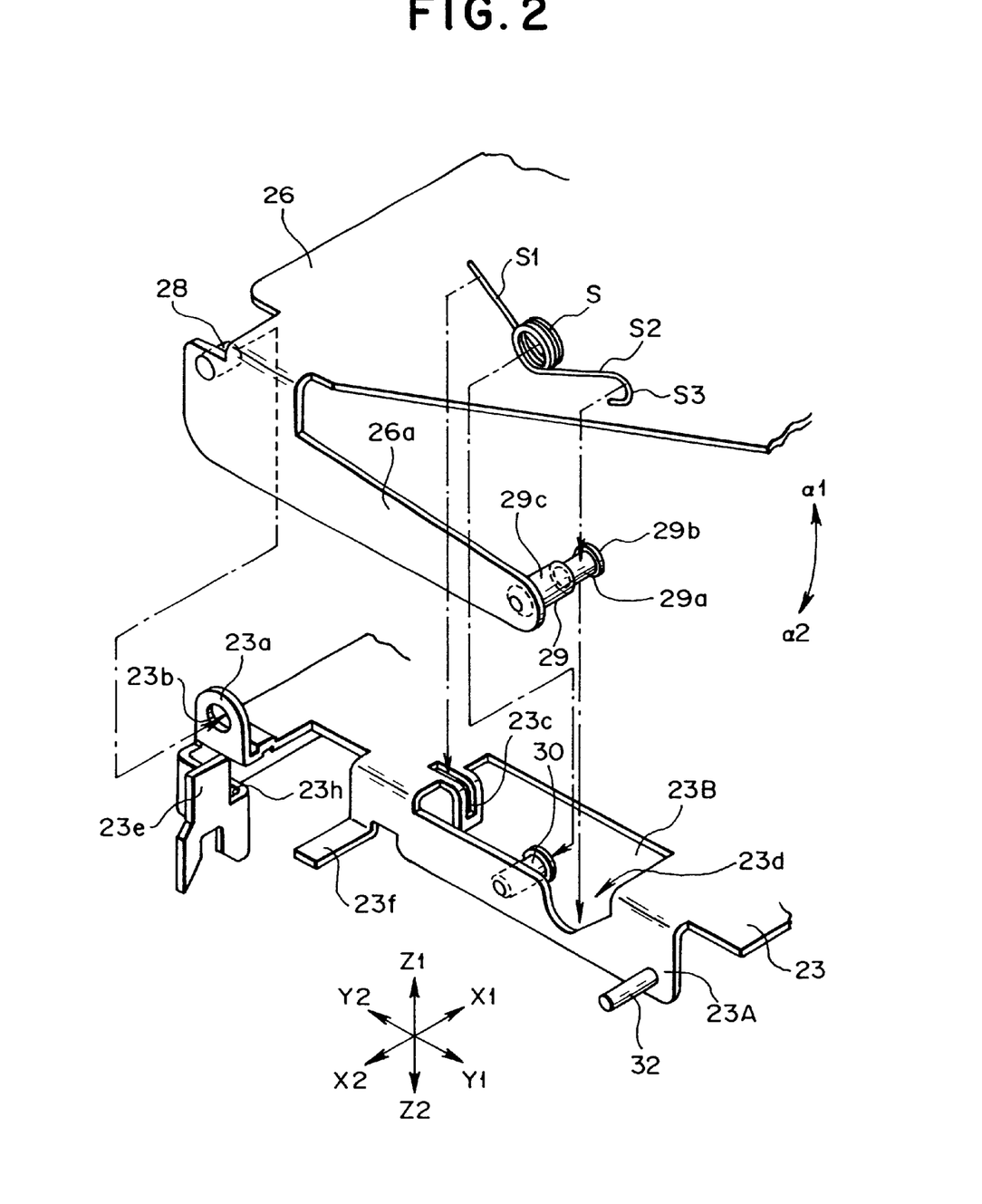
FIG. 2 is a partial perspective view that illustrates a portion of the disk clamping mechanism.

FIG. 1 is a side view of a CD player provided with a disk clamping mechanism of one embodiment of the invention, in which FIG. 1A illustrates a clamp-released state of a disk, and FIG. 1B illustrates a clamped state of the disk. FIG. 2 is a perspective view to illustrate the major part of the disk clamping mechanism.

The CD player shown in FIG. 1 is provided with a disk drive unit 22 inside an enclosure 21. A disk clamping mechanism 25 is provided on the disk drive unit 22. The CD player is used in conjunction with a disk D.

The CD player is provided with an insertion slot (not shown), for example, on the Y1 side of the front panel of the enclosure 21, and the disk D is inserted manually from this insertion slot. A disk conveying means (not shown), for example a carrier roller, provided between the insertion slot and the disk drive unit 22 carries the disk D to the disk drive unit 22 and loads it thereon. Or, a magazine (not shown) having a plurality of disks D each stacked on a tray is mounted on the Y1 side of the enclosure 21. A tray with a disk D is selected from inside the magazine and is transferred to the disk drive unit 22 by a conveying means (not shown), for example a tray conveying mechanism, and the disk on the tray is loaded on the disk drive unit 22.

The disk drive unit 22 comprises a spindle motor 24 installed on a drive chassis 23, and a turntable T fixed on a rotary shaft of the spindle motor 24.

The drive chassis 23 is elastically supported by elastic support members 31, 31 that are made up with a plurality of coil springs and oil clampers installed in the enclosure 21.

As shown in FIG. 2, the drive chassis 23 is formed of a metal plate, on which are formed bent pieces 23a, 23a that are formed bent in the Z1 direction on both the X2 and X1 ends of the Y2 side, shown for only one end). The bent pieces 23a, 23a each have rotation holes 23b, 23b bored therein.

The drive chassis 23 has a side plate 23A formed bent on the X2 side, and has a cutout part 23B punched out near the side plate 23A. This cutout part 23B has a hook part 23c formed on a part of the edge thereof.

The side plate 23A has a recess 23d formed in the Z2 direction on a part thereof. Further, the side plate 23A has a control piece 23f provided, which is formed by bending a part of the side plate 23A in the X2 direction. The side plate 23A further has a control pin 32 fixed on a position detached from the control piece 23f; the control pin 32 extends in the X2 direction from the side plate 23A.

Inside the side plate 23A is implanted a hook pin 30 that extends inward (toward the X1 side). This hook pin 30 is sheathed with a wound part of a torsion spring or energizing member S, which constitutes energizing means. The torsion spring S comprises energizing arms S1 and S2, and the hook pin 30 acts as a support end for the energizing arm S2. As shown in FIG. 2, the energizing arm S1 of the torsion spring S is hooked in the hook part 23c, and the other energizing arm S2 of the torsion spring S is bent in a U-shape on the front end thereof to form a hook S3. The energizing arm S2 of the torsion spring S is hooked by a pressed part 29, which is described later.

As shown in FIG. 1, the disk clamping mechanism 25 comprises a clamp arm 26. The clamp arm 26 is formed of a metal plate. A support plate 35 made of a flat spring is fastened on the front end of this clamp arm 26, which supports a clamper 27 to freely rotate.

As shown in FIG. 2, the clamp arm 26 has a substantially L-shaped operating part 26a provided on the base of the side X2 and Y2, which is formed bent in the Z2 direction. A swing shaft 28 extending in the X1 direction is attached on the base end of the operating part 26a. The swing shaft 28 is inserted in the rotation hole 23b of the bent piece 23a on the drive chassis 23. In the same manner as the swing shaft 28, another swing shaft extending in the X1 direction is also attached on the X1 side of the clamp arm 26, and is inserted in the rotation hole of the other bent piece (X1 side) on the drive chassis 23. The clamp arm 26 is supported to freely rotate in the α1 direction (clamp-released direction) and the α2 direction (clamped direction), with the swing shaft 28 serving as the swing center.

The pressed part 29 is fastened on the front end (Y1 side) of the operating part 26a of the clamp arm 26, which extends in the X1 direction. The pressed part 29 is a pin fastened on the operating part 26a. Or, the pressed part 29 may be integrally formed bent from the operating part 26a.

A base end 29c of the pressed part 29 faces a position corresponding to the recess 23d formed on the side plate 23A, and a front part 29a of the pressed part 29 extends toward the inside (X1 side) from the side plate 23A. The front part 29a is formed such that the diameter is made thinner as the front part 29a extends away from the base end 29c, and the front end thereof is formed into a flange 29b whose diameter is the same as that of the base end 29c.

The energizing arm S2 of the torsion spring S is hooked on the front part 29a from the upper side. Accordingly, the pressed part 29 is energized always in the α2 direction (clamped direction) by the energizing arm S2, and the clamp arm 26 is energized in the direction of the turntable T.

In the process to incorporate the clamp arm 26 into the drive chassis 23, in a state that the clamp arm 26 is slanted toward the α1 direction (for example, slanted vertically to the drive chassis 23), the swing shaft 28 extending in the X1 direction and the swing shaft attached on the other side each are inserted into the rotation holes 23b in the X1 direction. Here, if a pair of the swing shafts are made differently in length, it will become easy to insert the swing shafts into each of the rotation holes 23b.

After inserting both the swing shafts 28 into both the rotation holes 23b in the X1 direction, if the clamp arm 26 is swung in the α2 direction, the operating part 26a formed on the side of the clamp arm 26 will be entrapped into a groove part 23h between the bent piece 23a of the drive chassis 23 and a side bent piece 23e extending in the X2 direction from the groove part 23h. As a result, the clamp arm 26 is restricted in its movement in the X direction, and the swing shafts 28 will accordingly not come off from the rotation holes 23b.

In a state that the clamp arm 26 is swung in the α2 direction, the energizing arm S2 of the torsion spring S with the wound part thereof mounted on the hook pin 30 is hooked from above on the front part 29a of the pressed part 29. The base end 29c of the pressed part 29 is pressed in the recess 23d of the drive chassis 23 by the energizing arm S2, and thereby the drive chassis 23 and the clamp arm 26 are assembled so as not to be detached from each other.

As mentioned above, only the insertion of the swing shaft 28 of the clamp arm 26 in the X1 direction and the incorporation of the torsion spring S into the drive chassis 23 will complete the assembly of the disk drive unit 22 made up with the drive chassis 23 and the clamp arm 26. As discussed below, the hook S3 formed on the front end of the energizing arm S2 restricts the swing range in the α1 direction of the pressed part 29. Within this restricted swing range, the operating part 26a will not come off from the groove part 23h, and thereby the clamp arm 26 and drive chassis 23 will not be separated, which facilitates the handling of the disk drive unit 22 as an assembly.

As shown in FIG. 1A and FIG. 1B, a switching member 33 that slides in the Y1 and Y2 directions is provided on a side of the X2 side of the drive chassis 23 and the clamp arm 26.

The switching member 33 has bent pieces 33A, 33B, and 33C formed thereon. The bent pieces 33A and 33C have restriction grooves 33a and 33c, respectively, formed thereon. The bent piece 33B, which functions as a clamp switching means, has a slope 33b formed on the Y2 side, and the upper side thereof functions as a pushing-up part 33d. The control piece 23f and the control pin 32 provided on the drive chassis 23 each are inserted in the restriction grooves 33a and 33c. Further, the bent piece 33B corresponds to a position that has the possibility of contact with the pressed part 29 of the operating part 26a of the clamp arm 26.

Further, a switching member 34 (not shown) that has bent pieces equivalent to the bent pieces 33A and 33C formed thereon is provided on a side of the side X1 of the drive chassis 23 and the clamp arm 26. Here, the switching member 34 does not have the clamp switching means formed thereon. These switching members 33 and 34 are coupled with a link member (not shown), whereby these are able to move in the same direction or opposite direction at the same time. And, these switching members 33 and 34 are driven in the Y1 and Y2 directions by a drive means (not shown).

In the case of a CD player designed for a single disk insertion, this drive means is driven when the disk D is detected to be inserted from an insertion slot on the front panel, or when a stop switch (not shown) provided on the operation panel of the CD player or on the remote control unit is operated. Or, in the case of a CD player designed for a disk changer system, the drive means is driven when a disk selection switch provided on the remote control unit or the like is operated and the disk D is taken out from inside the magazine, or when a disk change switch (not shown) or the stop switch is operated.

Next, the movement of the disk clamping mechanism thus constructed will be explained.

(clamp-released state)

The clamp-released state shown in FIG. 1A is a state before the disk D is carried into the disk drive unit 22, or a state after the disk D is brought out from the disk drive unit 22.

In this clamp-released state, the switching member 33 is shifted to the Y2 direction by the foregoing drive means (not shown). At this moment, the control piece 23f and the control pin 32 formed on the side plate 23A of the drive chassis 23 are inserted in the restriction grooves 33a and 33c of the bent pieces 33A and 33C of the switching member 33, and they are arrested at the positions shown by the symbols P1, P2 in FIG. 1A. Therefore, the whole disk drive unit 22 is in a restricted state, which facilitates the alignment of the disk D, which is being inserted, and the turntable T.

The bent piece 33B of the switching member 33, which constitutes the clamp switching means, is in contact with the pressed part 29 provided on the front end of the operating part 26a of the clamp arm 26. The pressed part 29 is pushed up in the Z1 direction by the pushing-up part 33d of the bent piece 33B accordingly. Thereby, the clamp arm 26 is swung in the α1 direction with the swing shaft 28 as the center of rotation, and the clamper 27 rises into the clamp-released state.

The disk D inserted from the insertion slot, or the disk D drawn out from inside the magazine, is carried by the disk conveying means into a space between the clamper 27 in this clamp-released state and the turntable T. Or, the disk D loaded on the turntable T is brought out (Y1 direction) toward the insertion slot or the magazine by the disk conveying means.

(clamped state)

Next, the clamped state shown in FIG. 1B will be described.

The loading of the disk D onto the turntable T is detected by a detection means (not shown) which is installed inside the disk drive unit 22. When the loading of the disk D is detected by the detection means, the drive means is started in the CD player to move the switching member 33 in the Y1 direction. At this moment, the restriction grooves 33a and 33c of the bent pieces 33A and 33C of the switching member 33 are shifted against the control piece 23f and the control pin 32, and the control piece 23f and the control pin 32 sit at the positions indicated by the symbols P3, P4 in FIG. 1B, where the CD player goes into the clamped state of the disk D. After completing the clamp, the switching member 33 is shifted further in the Y1 direction, the control piece 23f and the control pin 32 slip out from the restriction grooves 33a and 33c, and the disk drive unit 22 goes into a state to be elastically supported by the elastic support members 31, 31.

While the switching member 33 moves from the position illustrated in FIG. 1A to the position illustrated in FIG. 1B, the bent piece 33B that has pushed the pressed part 29 of the operating part 26a up in the Z1 direction comes off from the pressed part 29. Accordingly, the clamp arm 26 is lowered in the clamped direction (α2 direction) by the energizing arm S2 of the torsion spring S, and the center of the disk D is clamped by the turntable T and the clamper 27 into the clamped state.

(energizing movement of the torsion spring)

Next, the energizing movement of the torsion spring S will be discussed in detail.

Figure 3:
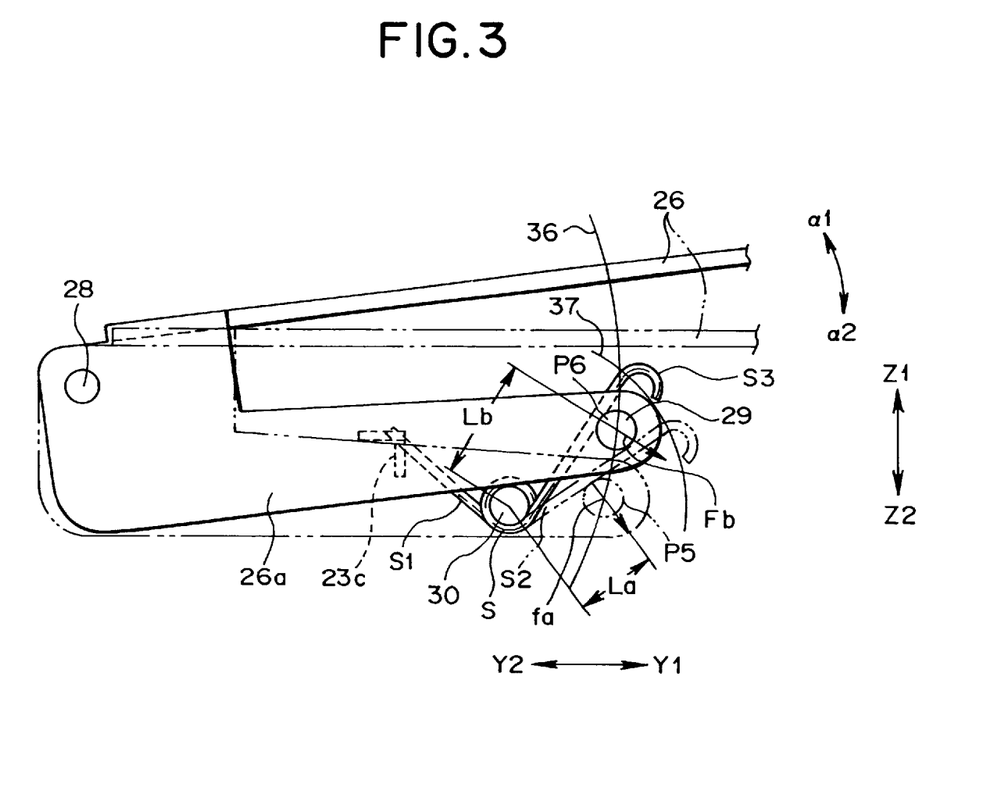
FIG. 3 is an enlarged view of a clamp arm in accordance with the present invention.

FIG. 3 is an enlarged view of the clamp arm that illustrates the movement of the torsion spring S. In FIG. 3, the clamp arm in the clamped state is illustrated by dotted lines, and the clamp arm that is swung in the clamp-released direction from that state is illustrated by solid lines.

In the clamped state, the pressed part 29 occupies a position indicated by the symbol P5, and the energizing arm S2 of the torsion spring S stays in the clamped state (dotted lines). At this moment, the elastic moment that the energizing arm S2 displays by the return force of the torsion spring S is given by Ma. And, the length from the hook pin 30, being the support end for the energizing arm S2 of the torsion spring S to the contact point (point of the energizing force applied) of the energizing arm S2 with the pressed part 29, is given by La. Then, the energizing force fa that the pressed part 29 receives from the torsion spring S in the clamped direction is expressed by (fa=Ma/La).

In the clamp-released state, the pressed part 29 is pushed up in the Z1 direction by the slope 33b of the bent piece 33B of the switching member 33. The symbol P6 illustrates a state in which the pressed part 29 is on the way to rise.

Here, if the length from the hook pin 30, being the support end for the energizing arm S2 of the torsion spring S to the contact point (point of the energizing force applied) of the energizing arm S2 with the pressed part 29, is given by Lb, the relation Lb>La will be satisfied. That is, as the clamp arm 26 swings in the clamp-released direction, the contact point (point of the energizing force applied) of the energizing arm S2 with the pressed part 29 moves farther from the hook pin 30, being the support end for the energizing arm S2.

Such a movement can be set by, for example, the following positional relation.

As shown in FIG. 3, the distance from the center of the swing shaft 28, being the swing fulcrum of the clamp arm 26 to the contact point (point of the energizing force applied) of the energizing arm S2 with the pressed part 29, is sufficiently longer than the distance from the center of the hook pin 30, being the support end of the energizing arm S2 to the contact point (point of the energizing force applied), and furthermore the hook pin 30 takes its position on the side of the drive chassis 23 against the swing shaft 28.

The aforementioned positional relation is only one example, however the positional relation accompanies the following condition: The curvature of a swing locus 36 of the pressed part 29 provided on the clamp arm 26 is greater than that of a swing locus 37 of the front end of the energizing arm S2. And further, the rate of change of the curvature that varies in the Y2 direction with the swing locus 37 going up in the α1 direction is greater than that of the curvature that varies in the Y2 direction with the swing locus 36 going up to the α1 direction (however, this condition is limited to the range of movement of the foregoing contact point (point of the energizing force applied)).

When the clamp arm 26 is swung to the position illustrated by the solid lines in FIG. 3 (clamp-released state), the elastic moment that the energizing arm S2 displays by the return force of the torsion spring S is given by Mb. The length from the hook pin 30, being the support end for the energizing arm S2 of the torsion spring S to the contact point (point of the energizing force applied) of the energizing arm S2 with the pressed part 29, is given by Lb as above. Then, the energizing force fb that the pressed part 29 receives from the torsion spring S will be expressed by (fb=Mb/Lb).

As the energizing force fa (=Ma/La) is compared with fb (=Mb/Lb), Ma<Mb can be induced from the variation of return of the torsion spring S. However, since La<Lb, when comparing the energizing force fa with fb, the rate of increase from fa to fb becomes smaller than that of the conventional example. Further, if the relation (Mb:Ma=Lb:La) or (Mb:Ma≈Lb:La) is set, i.e. the relation between Mb and Ma equals or approximately equals the relation between Lb and La, it will be possible to set the energizing force that the clamp arm 26 receives in the clamped direction to the same or substantially same level in both the states of the solid lines and dotted lines in FIG. 3.

Therefore, even if the elasticity to clamp the disk D by the clamper 27 and the turntable T is increased, it will be possible to suppress the increase of the elastic reaction that acts on the bent piece 33B from the pressed part 29, while swinging the clamp arm 26 to the state of the solid lines (clamp-released state) in FIG. 3. That is, it is possible to reduce the load when swinging the clamp arm 26 in the clamp-released direction by the slope 33b of the clamp switching means. Accordingly, it is possible to reduce the load of the motor and the like that activates the switching member 33, and to decrease the friction of sliding parts between the pressed part 29 and the bent piece 33B.

Next, if the clamp arm 26 is swung further in the $\alpha 1$ direction from the state of the solid lines in FIG. 3, it will move the pressed part 29 toward the front end of the energizing arm S2 until the pressed part 29 is restrained by the hook S3. Even though the clamp arm 26 is swung still further in the $\alpha 1$ direction from this state of the pressed part 29 being restrained by the hook S3, the difference in the rates of change of the curvatures of the swing loci 36 and 37 will restrict a further swing. That is, the hook S3 can be a stopper that determines the limit of swing of the clamp arm 26 in the $\alpha 1$ direction.

As mentioned above, in the state that the swing of the clamp arm 26 in the $\alpha 1$ direction is restricted by the hook S3, if a measure that renders the operating part 26a not to fall out from the groove part 23h is taken, the clamp arm 26 will not come off from the drive chassis 23.

FIG. 4 illustrates another embodiment of the energizing means.

Figure 4A:
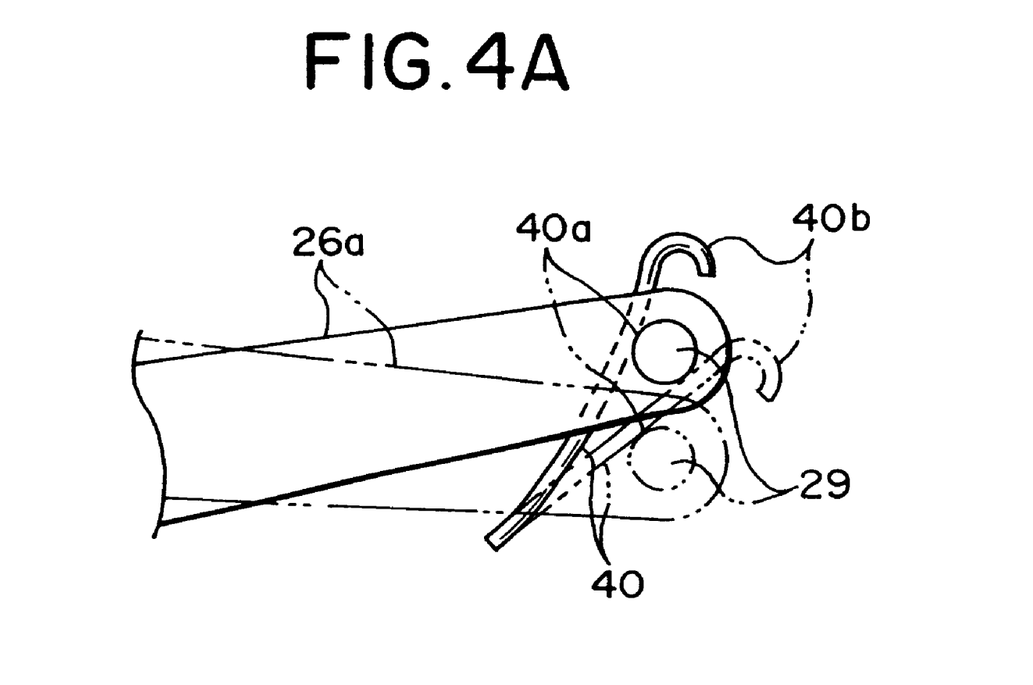
FIG. 4A and FIG. 4B are partial side views that illustrate another embodiment of the energizing means.

FIG. 4A illustrates an example in which a cantilevered flat spring 40 is employed as the other energizing arm that replaces the energizing arm S2 of the torsion spring S in the previous embodiment.

The base end of the flat spring 40 is fastened to the inside (X1 side) of the side plate 23A of the drive chassis 23, a venter 40a of the flat spring 40 comes in contact with the pressed part 29, and a force of flexure by the flat spring 40 energizes the pressed part 29 in the $\alpha 2$ direction. A hook part 40b bent in a U-shape is formed on the front end (free end) of the flat spring 40, which is made to exhibit the stopper function.

Figure 4B:
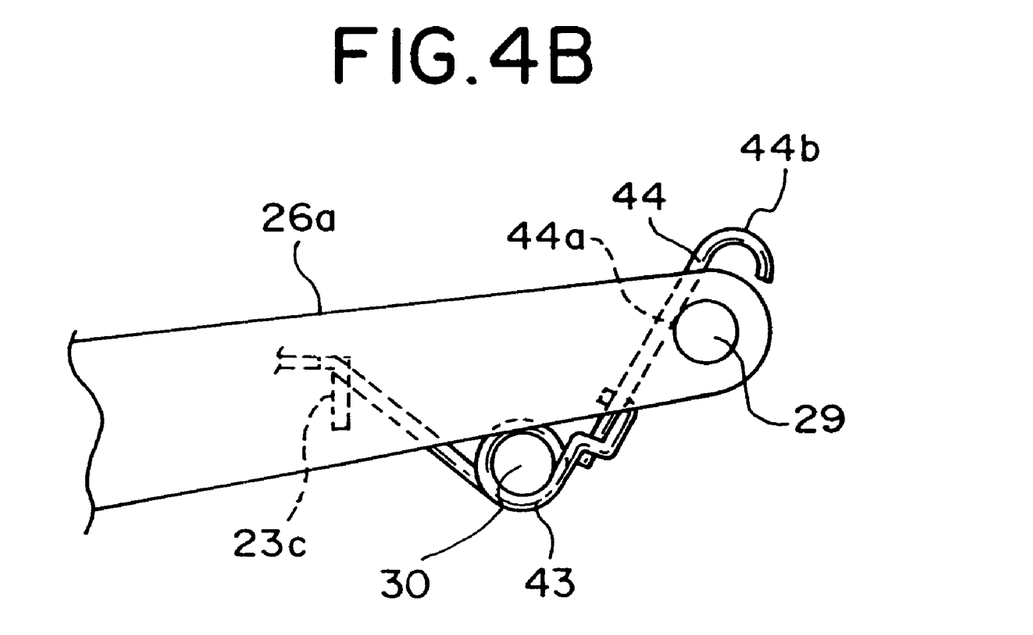

FIG. 4B illustrates another example, in which a lever 44 is fastened to the front end of a torsion spring 43, and a venter 44a of the lever 44 serves as the energizing arm that energizes the pressed part 29. The lever 44 has a hook part 44b formed bent or projected on the front end thereof.

Or, the construction may be such that the lever 44 is supported by the hook pin 30 so as to freely rotate and energized in the $\alpha 2$ direction by the torsion spring 43.

According to the invention described above, in the clamped state of a disk, the disk clamping mechanism is able to exhibit a sufficient energizing force to clamp the disk; and in the clamp-released state, it is able to suppress the increase of resistance for moving the clamper in the clamp-released direction.

Further, it is also possible to construct a stopper that determines the limit of swing of the clamp arm, with the energizing member that energizes the clamp arm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A disk clamping mechanism to be used with a disk, the disk clamping mechanism comprising:

a turntable, the turntable for rotating a disk;

a clamp arm, the clamp arm supported so as to freely swing via a swing fulcrum in a clamped direction facing the turntable and in a clamp-released direction facing opposite the turntable;

a clamper, the clamper supported by the clamp arm so as to freely rotate, the clamp arm clamping a disk between the turntable and the clamp arm;

an energizing means, the energizing means for applying an energizing force to energize the clamp arm in the clamped direction; and a clamp switching means, the clamp switching means for swinging the clamp arm in the clamp-released direction against the energizing force of the energizing means, wherein:

the energizing means swings so as to follow a swing of the clamp arm;

the energizing means comprises an energizing arm and a support end for the energizing arm, the energizing arm applying the energizing force in the clamped direction to a pressed part of the clamp arm at a contact point; and the positions of the swing fulcrum of the clamp arm and the support end for the energizing arm are set in such a manner that the contact point of the energizing force applied from the energizing arm moves farther from the support end for the energizing arm as the clamp arm swings in the clamp-released direction.

2. A disk clamping mechanism as claimed in claim 1, wherein: the energizing arm is in direct contact with the pressed part; the energizing arm is provided with a hook part that hinders the pressed part from moving when the contact point of the pressed part arm moves farther from the support end of the energizing arm; and a limit of the swing of the clamp arm in the clamp-released direction is given when the pressed part is restrained by the hook part.

3. A disk clamping mechanism as claimed in claim 1, wherein the distance between the fulcrum of the clamp arm and the contact point of the energizing arm is longer than the distance between the support end for the energizing arm and the contact point of the energizing arm, and the support end for the energizing arm is located more forward in the clamped direction than is the fulcrum of the clamp arm.

4. A disk clamping mechanism as claimed in claim 3, wherein the energizing arm is in direct contact with the pressed part; the energizing arm is provided with a hook part that hinders the pressed part from moving when the contact point of the energizing arm moves farther from the support end for the energizing arm; and a limit of the swing of the clamp arm in the clamp-released direction is given when the pressed part is restrained by the hook part.

5. A disk clamping mechanism as claimed in claim 1, wherein the energizing arm is an arm of a torsion spring or a flat spring.

6. A disk clamping mechanism to be used with a disk, the disk clamping mechanism comprising a turntable, the turntable giving a rotation to a disk;

a chassis, the chassis mounting the turntable;

a clamp arm, the clamp arm attached to the chassis, the clamp arm supported so as to freely swing via a swing fulcrum in a clamped direction facing the turntable and in a clamp-released direction facing opposite the turntable;

a clamper, the clamper supported by the clamp arm so as to freely rotate, the clamper clamping a disk between the turntable and the clamp arm;

an energizing means, the energizing means for applying an energizing force to energize the clamp arm in the clamped direction; and a clamp switching means, the clamp switching means for swinging the clamp arm in the clamp-released direction against the energizing force of the energizing means, wherein:
the energizing means comprises a support end whereby the energizing means is supported by the chassis, and an energizing arm extending from the support end;
the energizing arm swings to follow a swing of the clamp arm and applies the energizing force to a pressed part of the clamp arm in the clamped direction;
the energizing arm has a contact point which contacts continuously with the pressed part; and
the contact point of the energizing arm moves farther from the support end when the clamp arm swings in the clamp-released direction.

7. A disk clamping mechanism as claimed in claim 6, wherein: the energizing arm is in direct contact with the pressed part; the energizing arm is provided with a hook part that hinders the pressed part from moving when the contact point of the energizing arm moves farther from the support end of the energizing arm; and a limit of the swing of the clamp arm in the clamp-released direction is given when the pressed part is restrained by the hook part.

8. A disk clamping mechanism as claimed in claim 6, wherein the distance between the fulcrum of the clamp arm and the contact point of the energizing arm is longer than the distance between the support end and the contact point of the energizing arm, and the support end of the energizing arm is located more forward in the clamped direction than is the fulcrum of the clamp arm.

9. A disk clamping mechanism as claimed in claim 8, wherein: the energizing arm is in direct contact with the pressed part; the energizing arm is provided with a hook part that hinders the pressed part from moving when the contact point of the energizing arm moves farther from the support end of the energizing arm; and a limit of the swing of the clamp arm in the clamp-released direction is given when the pressed part is restrained by the hook part.

10. A disk clamping mechanism as claimed in claim 6, wherein the energizing arm is an arm of a torsion spring or a flat spring.

11. A disk player provided with a disk clamping mechanism to be used with a disk, the disk clamping mechanism comprising:

a turntable, the turntable for rotating a disk;

a clamp arm, the clamp arm supported so as to freely swing via a swing fulcrum in a clamped direction facing the turntable and in a clamp-released direction facing opposite the turntable;

a clamper, the clamper supported by the clamp arm so as to freely rotate, the clamp arm clamping a disk between the turntable and the clamper;

an energizing means, the energizing means for applying an energizing force to energize the clamp arm in the clamped direction; and a clamp switching means, the clamp switching means for swinging the clamp arm in the clamp-released direction against the energizing force of the energizing means, wherein:
the energizing means swings to follow a swing of the clamp arm;
the energizing means comprises an energizing arm and a support end for the energizing arm, the energizing arm applying the energizing force in the clamped direction to a pressed part of the clamp arm at a contact point; and
the positions of the swing fulcrum of the clamp arm and the support end for the energizing arm are set in such a manner that the contact point of the energizing force applied from the energizing arm to the pressed part moves farther from the support end for the energizing arm as the clamp arm swings in the clamp-released direction.

12. A disk player provided with a disk clamping mechanism as claimed in claim 11, wherein the energizing arm is in direct contact with the pressed part; the energizing arm is provided with a hook part that hinders the pressed part from moving when the contact point of the energizing arm moves farther from the support end for the energizing arm; and a limit of the swing of the clamp arm in the clamp-released direction is given when the pressed part is restrained by the hook part.

13. A disk player provided with a disk clamping mechanism as claimed in claim 11, wherein the distance between the fulcrum of the clamp arm and the point of application is longer than the distance between the support end for the energizing arm and the point of application, and the support end for the energizing arm is located more forward in the clamped direction than is the fulcrum of the clamp arm.

14. A disk player provided with a disk clamping mechanism as claimed in claim 13, wherein the energizing arm is in direct contact with the pressed part; the energizing arm is provided with a hook part that hinders the pressed part from moving when the contact point of the pressed part moves farther from the support end for the energizing arm; and a limit of the swing of the clamp arm in the clamp-released direction is given; when the pressed part is restrained by the hook part.

15. A disk player provided with a disk clamping mechanism as claimed in claim 11, wherein the energizing arm is an arm of a torsion spring or a flat spring.

* * * * *